(12) United States Patent
Quinn et al.

(10) Patent No.: US 8,302,631 B2
(45) Date of Patent: Nov. 6, 2012

(54) CONTROL VALVE FOR A FLUID TREATMENT SYSTEM

(75) Inventors: Kerry Quinn, Palatine, IL (US); Ken Reed, Kenosha, WI (US); Dan Morrison, Arlington Heights, IL (US)

(73) Assignee: Culligan International Company, Rosemont, IL (US)

( * ) Notice: Subject to any disclaimer, the term of this patent is extended or adjusted under 35 U.S.C. 154(b) by 796 days.

(21) Appl. No.: 12/242,287

(22) Filed: Sep. 30, 2008

(65) Prior Publication Data

US 2009/0084453 A1 Apr. 2, 2009

Related U.S. Application Data

(60) Provisional application No. 60/997,317, filed on Oct. 2, 2007.

(51) Int. Cl.
*F16K 31/48* (2006.01)
*C02F 1/00* (2006.01)
*C02F 1/42* (2006.01)
*C02F 5/00* (2006.01)
*F17D 3/00* (2006.01)

(52) U.S. Cl. ............... 137/637; 137/599.15; 137/624.18

(58) Field of Classification Search ............... 137/637, 137/597, 624.19, 599.15, 253, 254, 553, 137/614.11, 614.18; 73/1.22, 514.26
See application file for complete search history.

(56) References Cited

U.S. PATENT DOCUMENTS

| | | | |
|---|---|---|---|
| 2,665,251 A * | 1/1954 | Mendenhall | 210/136 |
| 2,799,294 A | 7/1957 | Nickols | |
| 2,823,698 A | 2/1958 | Larison | |
| 3,372,708 A | 3/1968 | Hotchkin | |
| 3,441,047 A | 4/1969 | Lyall et al. | |
| 3,708,068 A | 1/1973 | Tischler | |
| 3,735,779 A | 5/1973 | Hunter | |
| 3,797,523 A | 3/1974 | Brane et al. | |
| 3,976,101 A | 8/1976 | Bassett | |
| 4,141,467 A | 2/1979 | Augustijn et al. | |
| 4,203,468 A | 5/1980 | Dietz | |
| 4,298,025 A | 11/1981 | Prior et al. | |
| 4,313,825 A | 2/1982 | Fleckenstein et al. | |
| 4,351,360 A | 9/1982 | Smyth | |
| 4,385,992 A | 5/1983 | Clauer et al. | |
| 4,429,267 A * | 1/1984 | Veale | 318/594 |
| 4,457,339 A | 7/1984 | Juan et al. | |
| 4,539,106 A | 9/1985 | Schwartz | |
| 4,919,314 A | 4/1990 | Nishiyama et al. | |
| 4,997,553 A | 3/1991 | Clack | |
| 5,022,664 A | 6/1991 | Kitada et al. | |
| 5,057,214 A * | 10/1991 | Morris | 210/136 |
| 5,082,022 A | 1/1992 | Boundy | |
| 5,128,035 A | 7/1992 | Clack et al. | |
| 5,162,080 A | 11/1992 | Drager et al. | |
| 5,174,337 A | 12/1992 | Dahlen et al. | |
| 5,203,081 A | 4/1993 | Dahlen et al. | |

(Continued)

*Primary Examiner* — Dinh Q Nguyen
*Assistant Examiner* — Chee-Chong Lee
(74) *Attorney, Agent, or Firm* — Greer, Burns & Crain, Ltd.

(57) ABSTRACT

A control valve assembly for a fluid treatment system including a valve housing defining a plurality of compartments and a piston assembly associated with each of the compartments. Each of the piston assemblies is configured to be independently movable in each of the compartments. The control valve assembly also includes a gearbox that is associated with the housing and includes a plurality of cams driven by a motor, where each of the cams is configured to drive a corresponding one of the piston assemblies.

18 Claims, 11 Drawing Sheets

U.S. PATENT DOCUMENTS

| | | | |
|---|---|---|---|
| 5,590,687 A | 1/1997 | Vaughan | |
| 5,628,899 A * | 5/1997 | Vaughan | 210/142 |
| 5,820,133 A | 10/1998 | Altshuler | |
| 5,910,244 A | 6/1999 | Stamos et al. | |
| 6,051,144 A | 4/2000 | Clack et al. | |
| 6,129,836 A | 10/2000 | Grayson | |
| 6,206,042 B1 | 3/2001 | Channell et al. | |
| 6,347,644 B1 | 2/2002 | Channell | |
| 6,354,172 B1 | 3/2002 | Piacenza et al. | |
| 6,379,560 B1 | 4/2002 | Tilp et al. | |
| 6,402,944 B1 | 6/2002 | Vaughan | |
| 6,436,282 B1 | 8/2002 | Gundrum et al. | |
| 6,444,127 B1 * | 9/2002 | Vaughan et al. | 210/662 |
| 6,456,202 B2 | 9/2002 | Johannsen et al. | |
| 6,596,159 B1 * | 7/2003 | Maruyama et al. | 210/139 |
| 6,776,901 B1 | 8/2004 | Vaughan et al. | |
| 7,285,220 B2 | 10/2007 | Jeong et al. | |
| 2001/0039465 A1 | 11/2001 | Schultz et al. | |
| 2003/0019802 A1 | 1/2003 | Roff et al. | |
| 2005/0235821 A1 | 10/2005 | Jeong et al. | |
| 2006/0096899 A1 * | 5/2006 | Lillback | 210/106 |
| 2006/0213825 A1 | 9/2006 | Averbeck | |
| 2006/0231146 A1 | 10/2006 | Lillback | |

* cited by examiner

Backwash

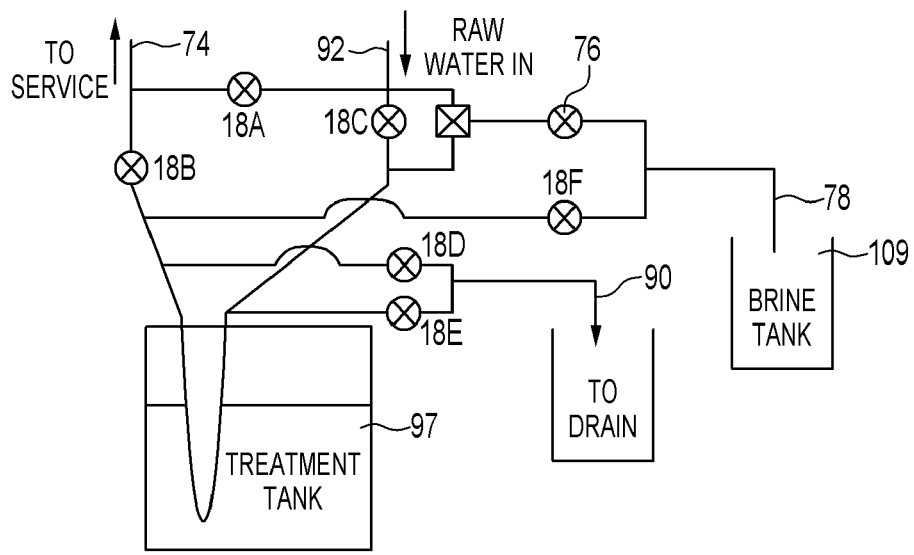

| UPFLOW CYCLE | 18A | 18B | 18C | 18D | 18E | 18F | 76 |
|---|---|---|---|---|---|---|---|
| SERVICE | X | O | O | X | X | X | X |
| BACKWASH | O | O | X | X | O | X | X |
| BRINE DRAW | O | X | X | O | X | X | O |
| RINSE | O | X | O | O | X | X | X |
| FILL | X | O | O | X | X | O | X |
| BYPASS | O | X | X | -- | X | -- | X |

| DOWNFLOW CYCLE | 18A | 18B | 18C | 18D | 18E | 18F | 76 |
|---|---|---|---|---|---|---|---|
| SERVICE | X | O | O | X | X | X | X |
| BACKWASH | O | O | X | X | O | X | X |
| BRINE DRAW | O | X | X | X | O | X | O |
| RINSE | O | X | O | O | X | X | X |
| FILL | X | O | O | X | X | O | X |
| BYPASS | O | X | X | X | X | X | X |

| KEY | |
|---|---|
| OPEN | O |
| CLOSE | X |
| N/A | -- |

| PROGRESSIVE FLOW CYCLE | 18A | 18B | 18C | 18D | 18E | 18F | 76 |
|---|---|---|---|---|---|---|---|
| SERVICE | X | O | O | X | X | X | X |
| BACKWASH | O | O | X | X | O | X | X |
| BRINE DRAW | O | X | X | O | X | X | O |
| RINSE | O | X | O | O | X | X | X |
| FILL | X | O | O | X | X | O | X |
| BLOCKED | X | -- | X | -- | -- | -- | X |

*FIG. 11*

CONTROL VALVE FOR A FLUID TREATMENT SYSTEM

PRIORITY CLAIM

This application claims priority to and the benefit of U.S. Provisional Application No. 60/997,317 filed on Oct. 2, 2007.

BACKGROUND OF THE INVENTION

The present invention relates generally to fluid treatment systems such as water treatment systems including water softeners, and more particularly to a control valve for a water softening system. It is recognized that many aspects of the present invention can be applied to other types of fluid treatment systems, such as filtering or de-ionizing systems.

"Hard water" refers to hardness ions or metal ions that are present in certain water sources. The metal ions in the water cause three main types of undesired effects. First, the metal ions react with soaps to hinder the soap's ability to form a lather. Second, the metal ions inhibit the cleaning effects of detergents. Third, the calcium and magnesium ions in "hard water" tend to adhere to the surfaces of pipes and heat exchangers. The building up of the ions (i.e., scale) on the surfaces of the pipes, etc. can significantly restrict water flow in the pipes and reduce the heat efficiency of the heat exchangers. Water softeners reduce the dissolved calcium, magnesium, and to some degree, manganese and ferrous iron ion concentration in "hard water" to significantly reduce the undesired effects of hard water.

Conventional water softeners include a raw water source, a treatment tank containing an ion exchange resin, a brine tank containing a brine solution, and a control valve for directing fluids between the source, the tanks and a drain or other output. Water softening occurs by running water through the ion exchange resin, which replaces the calcium and magnesium ions in the water with sodium ions. As the ion exchange process continues, the resin becomes saturated with the metal ions and eventually loses its capacity to soften water. As a result, the resin must be replenished with sodium ions using a process called regeneration. During regeneration, the calcium and magnesium ions are removed and the sodium ions are added back to the resin to restore the resin's capacity to soften water.

During regeneration, brine, a concentrated or saturated salt solution, is passed through the ion exchange resin, where the ions in the resin are replaced with sodium ions. Regeneration is a multi-step process that incorporates a number of cycles, specifically, backwash, brine draw, rinse and refill cycles.

Conventional water softening systems are generally provided with a control valve for controlling the flow of water through the system and the operation of the various regeneration cycles. The control valve directs the water flow between the raw water inlets, the various inlets and outlets of the conditioning tank and the brine tank, the outlet for supplying water to the residence or commercial structure, and the drain. For the valve to operate without leakage, appropriate sealing is necessary.

To provide such sealing, conventional water softening systems typically include a seal pack assembly having a single piston provided within the control valve. However, because the single piston generally reciprocates between several O-ring seals within the seal pack, the O-rings become worn after continued use. Because all of the valve ports are controlled by a single piston, the entire assembly must be removed from the valve when only a single O-ring requires replacement, thereby increasing the cost to the user and reducing the efficiency of the system.

Further, the single seal-pack piston in conventional control valves requires precise positioning to properly control the flow relative to each of the flow passages. If the piston fails to stop in the appropriate position within the valve, the flow path may not be sufficiently open or closed, reducing the flow rates in the desired paths and the operating efficiency of the system.

Also, conventional control valves are generally only configured to run a specific type of regeneration: downflow (i.e., where the brine enters the treatment tank in the same flow direction as the softened water); upflow (i.e., where the brine and softened water enter the treatment tank in opposite flow directions); or in commercial applications, progressive flow (i.e., where several water softeners are linked together). Specifically, the flow paths in conventional control valves are linked together in a fixed relationship because the flow paths all utilize the same single seal-pack piston. Accordingly, the user is unable to alter the water softening system from downflow regeneration to upflow regeneration, without removing and replacing certain internal valve components such as the piston, for example.

BRIEF SUMMARY OF THE INVENTION

The present control valve assembly includes individual piston assemblies configured for independent movement such that the respective O-rings slide only when necessary to seal or open the respective flow paths. Further, the piston assemblies in the present control valve assembly are either configured to be entirely open or entirely closed, which improves flow rates. In addition, the present control valve assembly includes a gearbox for driving the pistons that can easily be removed and reconfigured to switch between upflow, downflow and progressive flow regeneration in a water softening system.

Specifically, the present control valve assembly for a fluid treatment system includes a valve housing defining a plurality of compartments and a piston assembly associated with each of the compartments. Each of the piston assemblies is configured to be independently movable in each of the compartments. The control valve assembly also includes a gearbox that is associated with the housing and includes a plurality of cams driven by a motor, where each of the cams is configured to drive a corresponding one of the piston assemblies.

BRIEF DESCRIPTION OF THE SEVERAL VIEWS OF THE DRAWINGS

FIG. 11 is a flow chart and accompanying tables showing the positions of the individual pistons during upflow, downflow and progressive flow regenerations.

DETAILED DESCRIPTION

Figure 1:
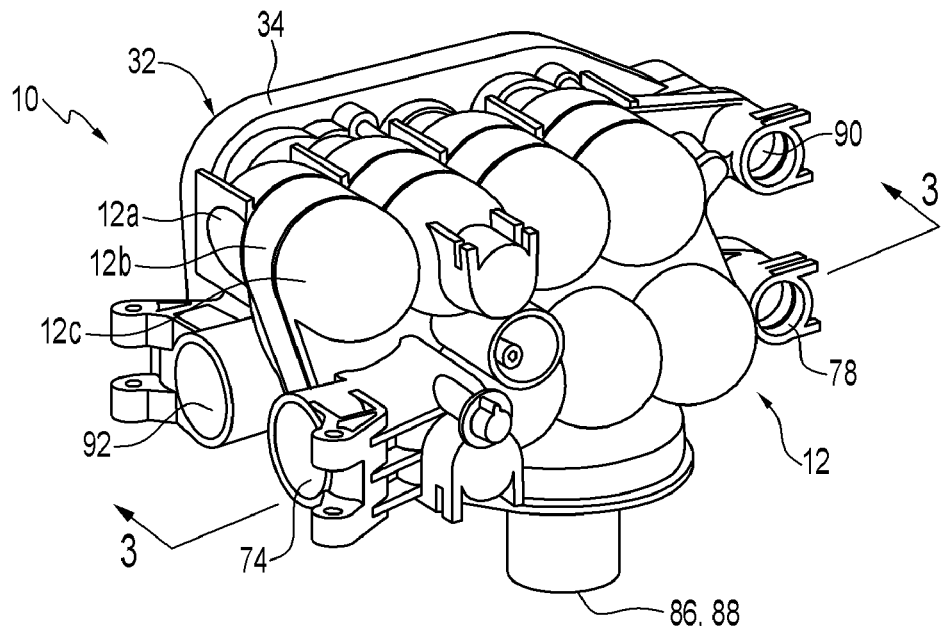
FIG. 1 is a rear perspective view of the present control valve assembly.

Referring now to FIGS. 1-3 and 5, a control valve assembly for a water softening system is provided, is generally designated 10 and includes a valve housing 12 defining a plurality of open-ended, generally capsule-shaped compartments 14 each configured for receiving a piston assembly 16. The valve housing 12 is preferably composed of three pieces joined together by sonic welding or other appropriate attachment method, each of the pieces being manufactured by reinforced resin such as Noryl® resin. However, other materials with similar properties are contemplated. Specifically, the housing 12 includes a front portion 12*a*, a middle portion 12*b*, and a rear portion 12*c* that, when joined together, form a plurality of the capsule-shaped compartments 14. It is recognized that other constructions for the housing 12 may be suitable, depending on the application.

Each of the piston assemblies 16 includes a piston 18 constructed and arranged for sliding within a corresponding one of the compartments 14. Specifically, six pistons 18A-18F are provided in the present assembly 10, each operating independently to respectively control flow to and from the inlets and outlets of the water softening system (93, 74), as described in greater detail below. Each of the pistons 18A-18F also includes at least one and preferably three sealing members 20 configured for providing a seal between the piston and an adjacent wall of the associated compartment 14 during movement of the piston. Preferably, the sealing members 20 are circular-shaped O-rings, as known in the art, although it is recognized that other conventional sealing members may be suitable.

Figure 3:
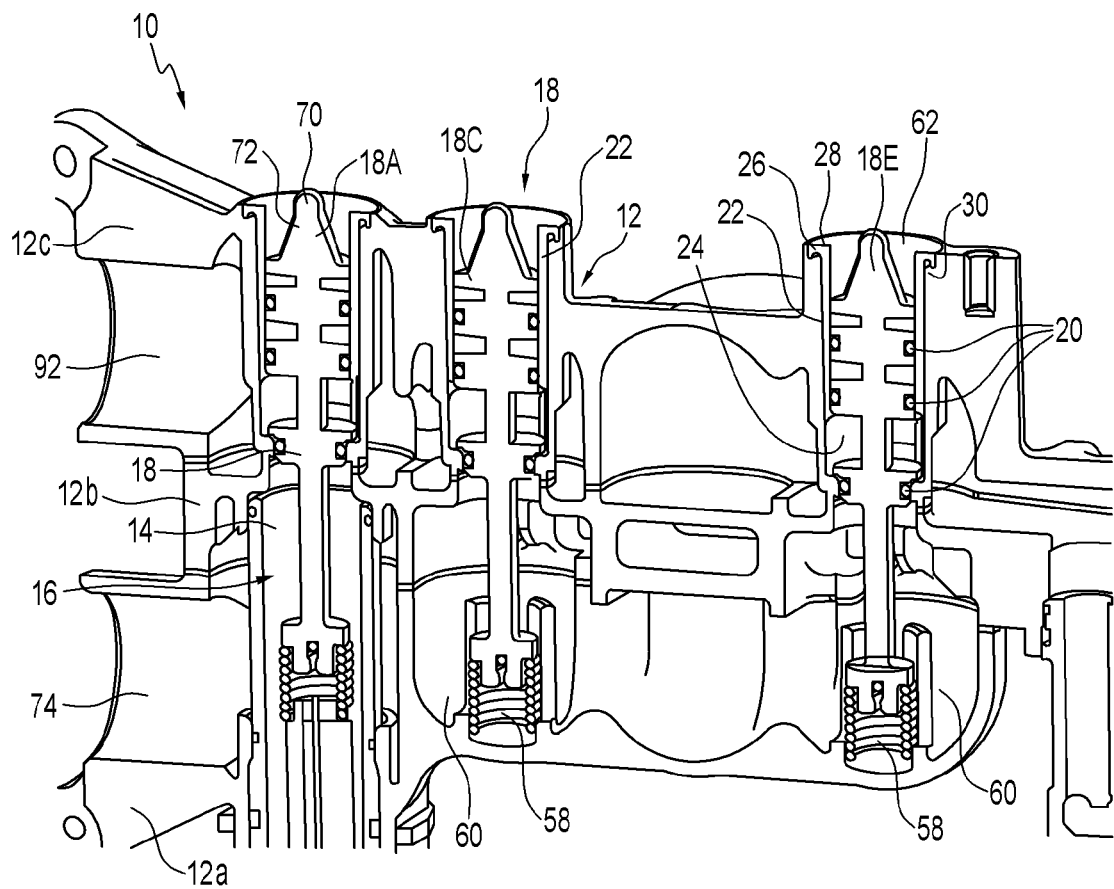
FIG. 3 is a partial cross-sectional view of the valve housing taken along the line 3-3 in FIG. 1 and in the direction generally indicated.

As seen in FIG. 3, the sealing members 20 slidingly contact the respective compartments 14 in the rear portion 12*c* of the housing 12. It is contemplated that by providing each of the sealing surfaces in the rear portion 12*c*, concentricity is guaranteed between the sealing members 20 and their sealing surfaces. In other words, the sealing members 20 are concentrically aligned with each other within the housing rear portion 12*c*, ensuring vertical alignment of the pistons 18A-18F in the respective compartments 14. Such vertical alignment is critical for proper sealing of the flow path when the flow path is open.

Further, because the sealing members 20 are provided on individual pistons 18A-18F and only seal against the respective compartment 14, the sliding distance of the sealing members is reduced in comparison to conventional control valve assemblies. Specifically, sealing members in conventional seal pack assemblies generally slide a total distance of two inches (one inch on the way up, and one inch on the way back) per cycle, which causes the sealing members to wear down quickly over time. In contrast, the sealing members 20 in the present control valve assembly 10 only slide a total distance of approximately 0.22 inches per cycle, amounting to approximately 90% less wear on the sealing members and a longer sealing life.

To enable efficient sliding of the pistons 18A-18F within the respective compartments 14, each of the piston assemblies 16 includes a sleeve 22 provided in the rear portion 12*c* that surrounds an upper interior sidewall or compartment sidewall 24 of the compartment. Preferably, each of the sleeves 22 is cylindrically shaped to complement the substantially cylindrical shape of the pistons 18A-18F. Furthermore, the sleeves 22 are sized to facilitate sealed reciprocal movement while preventing lateral movement of the pistons 18A-18F within the respective compartments 14. Each of the sleeves 22 includes a lip 26 radially extending from an upper edge 28 of the sleeve. To properly seal the sleeve 22 within its respective housing compartment 14, the lip 26 is configured for engaging a seat 30 defined in the rear portion 12*c* of the housing 12, adjacent to the compartment sidewall 24.

The sleeves 22 are preferably sonically welded to the respective sidewalls 24 to ensure a secure attachment to the compartment 14, although it is recognized that other suitable attachment methods may be appropriate, such as threading the sleeves 22 to the respective sidewalls 24 for ease of replacement. To enable easy sliding of the pistons 18A-18F, the sleeves 22 are preferably manufactured from non-reinforced Noryl® resin, a less abrasive and therefore smoother material than the reinforced Noryl® resin used to manufacture the housing 12, although other suitable materials may be appropriate. It is contemplated that by manufacturing the sleeves out of a smooth, non-abrasive material, the life of the sealing members 20 will be increased. The smooth material of the sleeves 22 also provides a self-wiping function during reciprocation of the pistons 18A-18F that removes debris that may accumulate on the sealing members 20 during operation.

It is contemplated that the individual pistons 18A-18F are advantageous over conventional control valve assemblies including a single seal pack assembly, because they operate independently of each other. Accordingly, if damage to one of the sealing members 20 on one of the pistons 18A-18F occurs, replacement is accomplished without needing to replace the remaining pistons. This is a significant advantage over conventional control valves that utilize a single seal pack assembly, because damage to one of the sealing members in the conventional control valves requires removal of the entire assembly, thereby significantly increasing costs. Also, the individual pistons 18A-18F of the present control valve assembly result in a smaller pressure drop across the control valve during operation than in the single piston utilized in conventional control valve assemblies, which significantly increases the efficiency of the water softening system.

Figure 4:
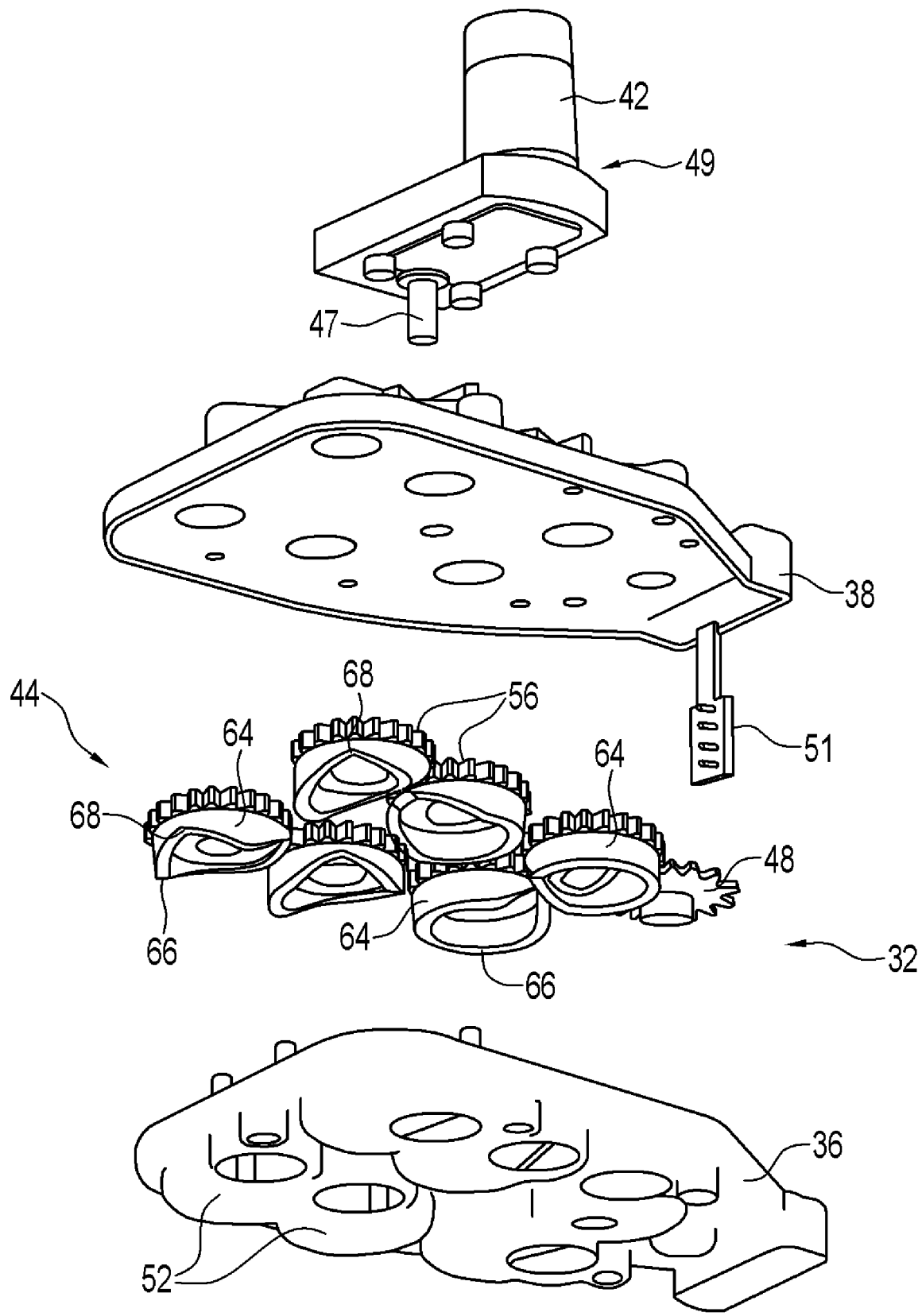
FIG. 4 is an exploded bottom perspective view of the gearbox of the valve assembly in FIG. 1.
Figure 4A:
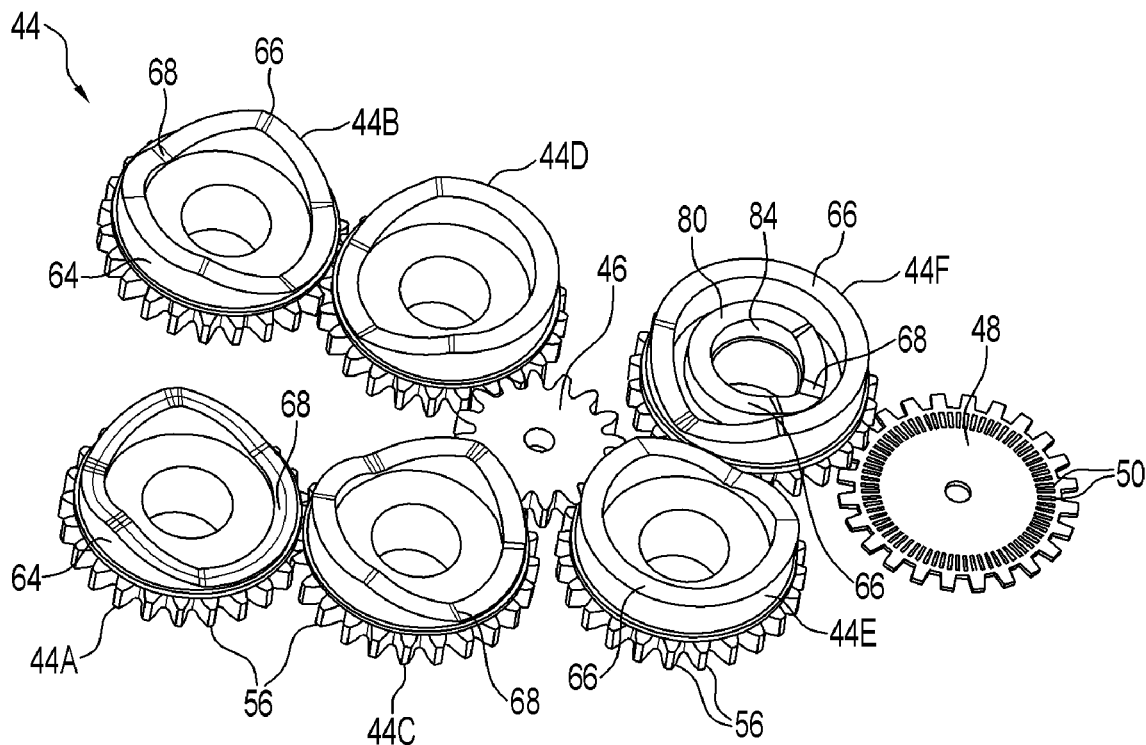
FIG. 4a is a top perspective view of the cam assembly shown in FIG. 4.
Figure 4B:
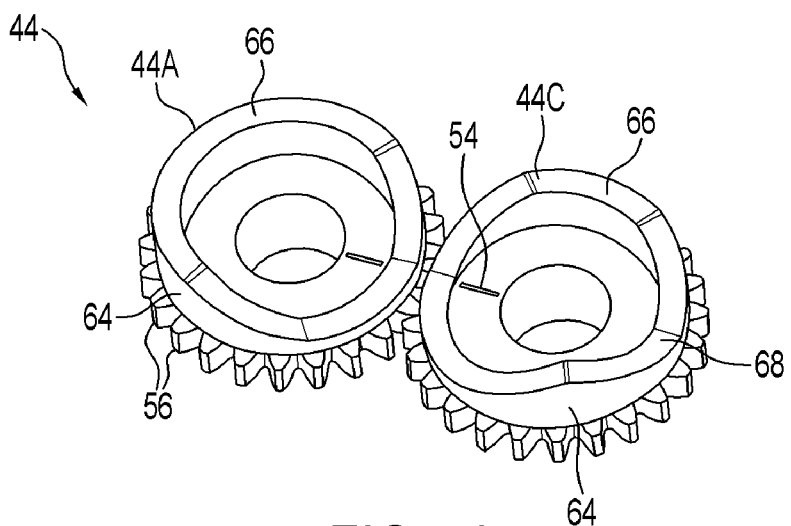
FIG. 4b is a fragmentary top perspective view of the cam assembly in FIG. 4a showing alignment indicators for the cams.

Referring now to FIGS. 4, 4*a* and 4*b*, the valve assembly 10 further includes a gearbox 32 having a gearbox housing 34 composed of a cover 36 and a base 38. The cover 36 of the gearbox 32 is removably connected to the valve housing rear portion 12*c* by a plurality of fasteners 40 or other suitable fasteners (FIG. 2), and is connected at the base 38 to a motor 42. As seen in FIG. 3, the gearbox 32 houses a plurality of cams 44A-44F, each cam corresponding to and configured for driving one of the pistons 18A-18F, which is described in further detail below.

The gearbox 32 includes a motor drive gear 46 that is driven by a motor shaft 47 extending from the motor 42 either directly or through an internal motor gearbox 49, and which is constructed and arranged for driving the cams 44A-44F during operation of the water softener system. A position feedback gear 48 is also provided in the gearbox 32 and is configured for notifying the user or service provider of the water softener's stage of service. As shown in FIG. 4a, the position feedback gear 48 is generally coplanar with a plurality of teeth 56 of one of the cams 44A-44F. During operation, the feedback gear 48 communicates with a water softener controller (not shown), indicating what stage the water softener is in.

Specifically, the feedback gear 48 includes a plurality of and preferably, seventy-two equally spaced slots 50 (FIG. 4a), where every set of twelve slots corresponds to a separate cycle of the water softener (i.e., backwash, brine draw, rinse, etc.). In an embodiment, one of the slots is blocked and indicates the "home" or "service" position. A gear sensor 51 (FIG. 4) is provided within the gearbox housing 34 adjacent to the feedback gear 48, and is configured for sending signals to the controller indicating the position of the cams 44A-44F. Preferably, the sensor 51 is a thru-beam sensor that optically interacts with the slots 50 and produces a series of light pulses detected by the sensor and sent to the controller.

The sensor 51 counts the number of slots 50, and is programmed such that for every twelve slots, a new step in the water softener cycle has been reached. When the position feedback gear 48 has rotated such that the blocked or "service" position is sensed by the sensor 51, the slot count is reset to zero, and a signal is sent to the controller indicating that the water softener has cycled through all of the steps (i.e., service, backwash, brine draw, rinse, refill, and bypass). However, it is appreciated that other methods for properly positioning the motor 42 and cams 44A-44F may be suitable, such as a magnetic disk/pick assembly, or a mechanical switch.

To ensure proper placement of the cams 44A-44F and gears 46, 48 within the gearbox 32, the cover 36 is formed to include a plurality of indentations 52 each configured to correspond to one of the cams or gears. It is contemplated that the indentations 52 can include numbers corresponding to one of the cams or gears to further ensure proper placement. Also, as seen in FIG. 4b, each of the cams 44A-44F includes alignment marks 54 (FIG. 4b) to enable proper alignment of the cams with respect to each other. Each of the cams 44A-44F also includes a plurality of teeth 56 that are arranged to prevent misalignment of the cams. The position feedback gear 48 can also include a marking (not shown) indicating the blocked or "service" starting position, such that the gear will be properly aligned with its respective cam 44A-44F for accurate cycle tracking. However, it is appreciated that other alignment methods may be appropriate, such as numbering, arrows, or the like.

To drive the pistons 18A-18F during the various water softener steps, the water pressure flowing through the compartments 14 typically provides enough force to bias the pistons. However, when the water pressure within the compartments 14 is less than 40 psi, additional biasing force is needed to drive the pistons 18A-18F. Accordingly, as seen in FIG. 3, each of the compartments 14 further includes a biasing element or spring 58 provided in a bottom, enclosed portion 60 of the compartment.

The springs 58 are configured for biasing the pistons 18A-18F through an opening 62 defined by the sleeve 22, such that the pistons engage a corresponding one of the cams 44A-44F. Specifically, as shown in FIG. 4a, each of the cams 44A-44F includes a top peripheral edge 64 defining a combination of peaks 66 and valleys 68. The top peripheral edge 64 is opposite the toothed end of the cams 44A-44F having a plurality of teeth 56. Preferably, the peaks 66 and valleys 68 are equally spaced around the circumference of the respective peripheral edges 64 at 60° increments, each peak or valley representing a separate step of the water softening process—service, backwash, brine draw, rinse, fill and bypass.

As the motor drive gear 46 drives the cams 44A-44F, the pistons 18A-18F are biased by a combination of water pressure and the corresponding spring 58, enabling vertical movement of the pistons within the respective compartments 14. Each of the pistons 18A-18F includes a nodule 70 extending from a top end 72 of the piston and constructed and arranged for engaging a corresponding one of the peripheral edges 64 of the cams 44A-44F. During operation, the nodule 70 travels along the peaks 66 and valleys 68 of the cam peripheral edges 64, enabling the pistons 18A-18F to open and close the respective flow paths located within the valve housing 12, which is described in further detail below. Thus, a rotational axis of each of the cams 44A-44Fs is generally parallel to a direction of travel of the pistons 18A-18F.

As the motor drive gear 46 drives the cams 44A-44F, the pistons 18A-18F are biased by a combination of water pressure and the corresponding spring 58, enabling vertical movement of the pistons within the respective compartments 14. Each of the pistons 18A-18F includes a nodule 70 extending from a top end 72 of the piston and constructed and arranged for engaging a corresponding one of the peripheral edges 64 of the cams 44A-44F. During operation, the nodule 70 travels along the peaks 66 and valleys 68 of the cam peripheral edges 64, enabling the pistons 18A-18F to open and close the respective flow paths located within the valve housing 12, which is described in further detail below.

Figure 2:
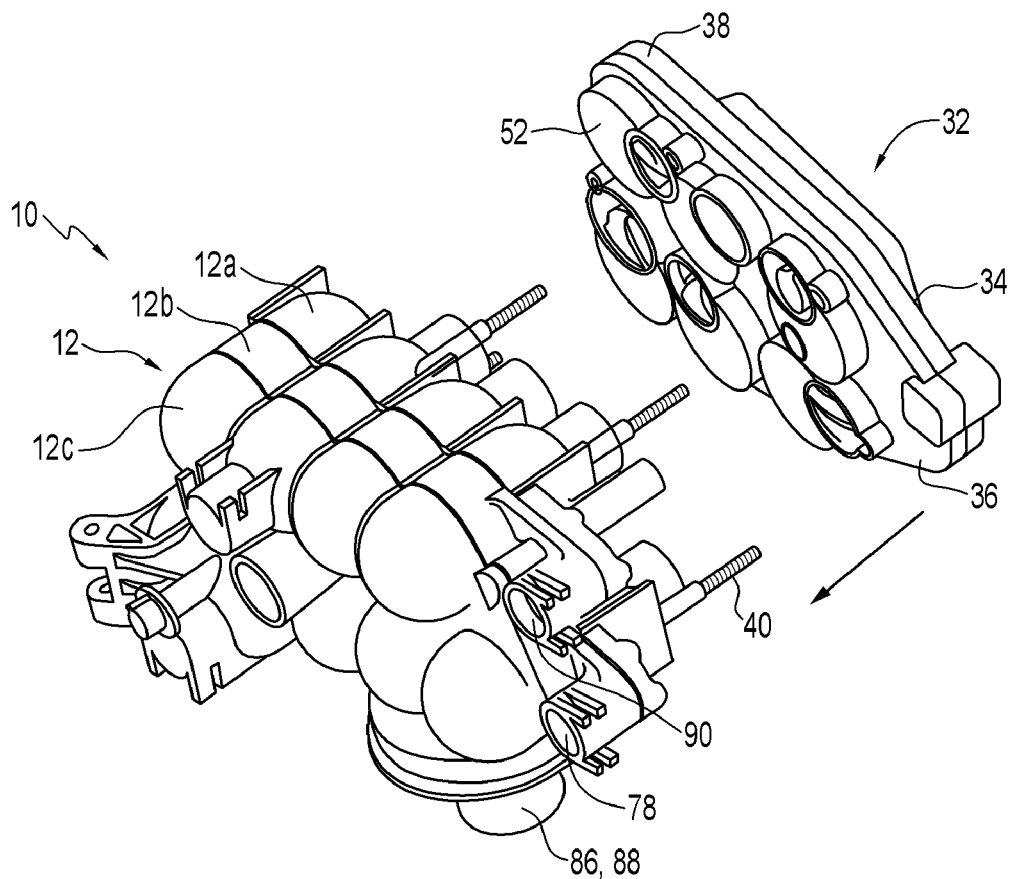
FIG. 2 is an exploded top perspective view of the valve assembly in FIG. 1 showing the attachment of the gearbox to the valve housing.

For example, when the piston nodule 70 is traveling along the peak 66 of the cam 44A, the distance of travel of the piston 18A is limited, and the piston is in the closed position, preventing water from exiting a bypass valve 74 (FIGS. 1 and 2). Similarly, when the piston nodule 70 is traveling along the valley 68 of the cam 44A, the distance of travel of the piston 18A is maximized, and the piston is in the open position, allowing water to flow through the bypass valve 74. This construction is advantageous over conventional control valves because in a single seal pack assembly, the piston must stop at the exact appropriate position to ensure proper flow through the valves. In contrast, by utilizing the individual pistons 18A-18F and cams 44A-44F, the flow path is either open or closed, depending on the position of the piston on the cam peripheral edge 64. Accordingly, the flow rates remain consistent when the pistons 18A-18F are in the open position, increasing operating efficiency during each cycle.

A brine piston 76 (FIGS. 5-9) is also provided within the valve housing 12 for enabling flow into and out of a brine tank valve 78, which is described in greater detail below. The brine piston 76 also includes a biasing element or brine spring (not shown) which with the assistance of water pressure within the housing 12, biases the brine piston towards a brine cam 80 (FIGS. 4 and 4a) concentrically provided in cam 44F, such that a brine piston nodule 82 engages a peripheral edge 84 of the brine cam, the peripheral edge including peaks 66 and valleys 68, similar to those provided on the cams 44A-44F.

As stated above, each of the peaks 66 and valleys 68 of the cams 44A-44F and 80 represent one of the six steps of the water softening process. It is contemplated that the present configuration of peaks 66, valleys 68 and nodules 70, 82 is more accurate than past control valve seal pack assemblies, because the peaks and valleys of the cams 44A-44F extend around the respective cam circumferences a distance of ± approximately 2.5°. In other words, as long as each of the pistons 18A-18F and 76 stop within 2.5° of its ideal stopping location (i.e., the central location of the peak/valley), the pistons will be on the correct peak 66 or valley 68. This is in contrast to current control valve assemblies, which because a single flow path exists, require the piston to stop at the exact desired location, increasing the chances of leakage and less than optimal flow rates during water softening.

As seen in FIGS. 5-9, the pistons 18A-18F slide within the corresponding compartments 14 to effect flow changes within the valve assembly 10. The phases shown and described in FIGS. 5-9 refer to downflow regeneration, where the brine enters the treatment tank in the same flow direction as the softened water. Each of the pistons 18A-18F opens or closes a separate flow path or valve. Specifically, as mentioned above, the piston 18A opens and closes the bypass valve 74 and the piston 18B allows either bypassed water or conditioned water from a treatment tank outlet 86 to return to the user's home through the bypass valve 74.

The piston 18C determines whether incoming raw water will enter a treatment tank inlet 88. Water flows from the tank outlet 86 to a drain 90 when piston 18D is in the open position, and water from the tank inlet 88 can exit through the drain when piston 18E is in the open position. The piston 18F enables water to flow from the tank outlet 86 through the brine tank valve 78. Finally, the brine piston 76 allows water from the brine tank to enter the tank inlet 88.

Figure 5:
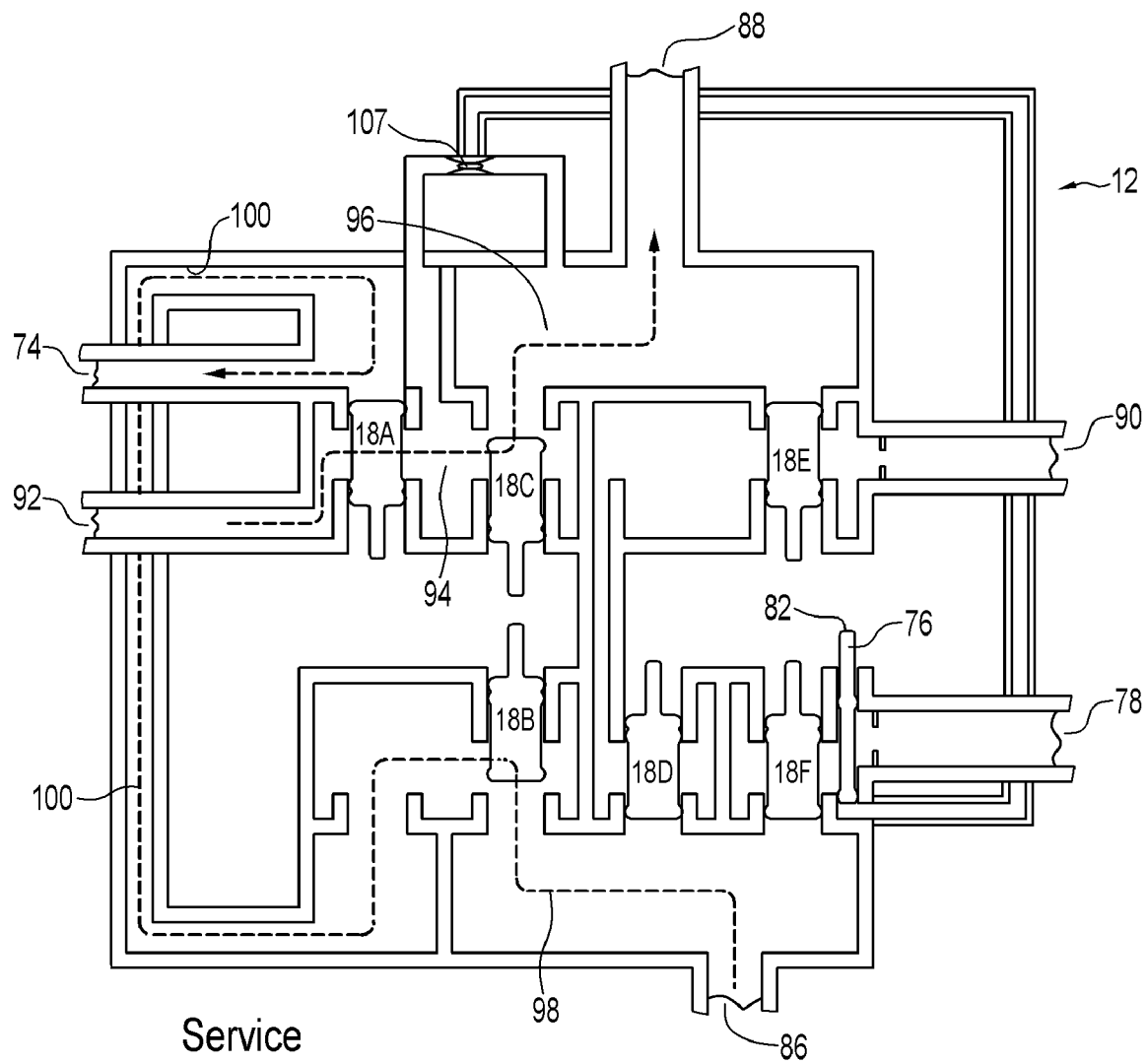
FIG. 5 is a schematic diagram of the valve assembly during the service cycle of a water softener.

In the service phase (i.e., the normal operating phase), shown in FIG. 5, raw water enters a raw water inlet 92, passes through a first channel 94 joining pistons 18A and 18C, and through a first flow path 96 defined between piston 18C and the tank inlet 88 of a treatment or resin tank 97 (FIG. 11), enabling the raw water to enter the tank. After being softened in the treatment tank 97, the softened water exits the tank outlet 86, passes through a second flow path 98 defined between the piston 18B and the tank outlet, flows through a third flow path 100 defined between the piston 18B and the bypass valve 74, and exits through the bypass valve, where it exits the valve housing 12 and can be used by the consumer.

Figure 6:
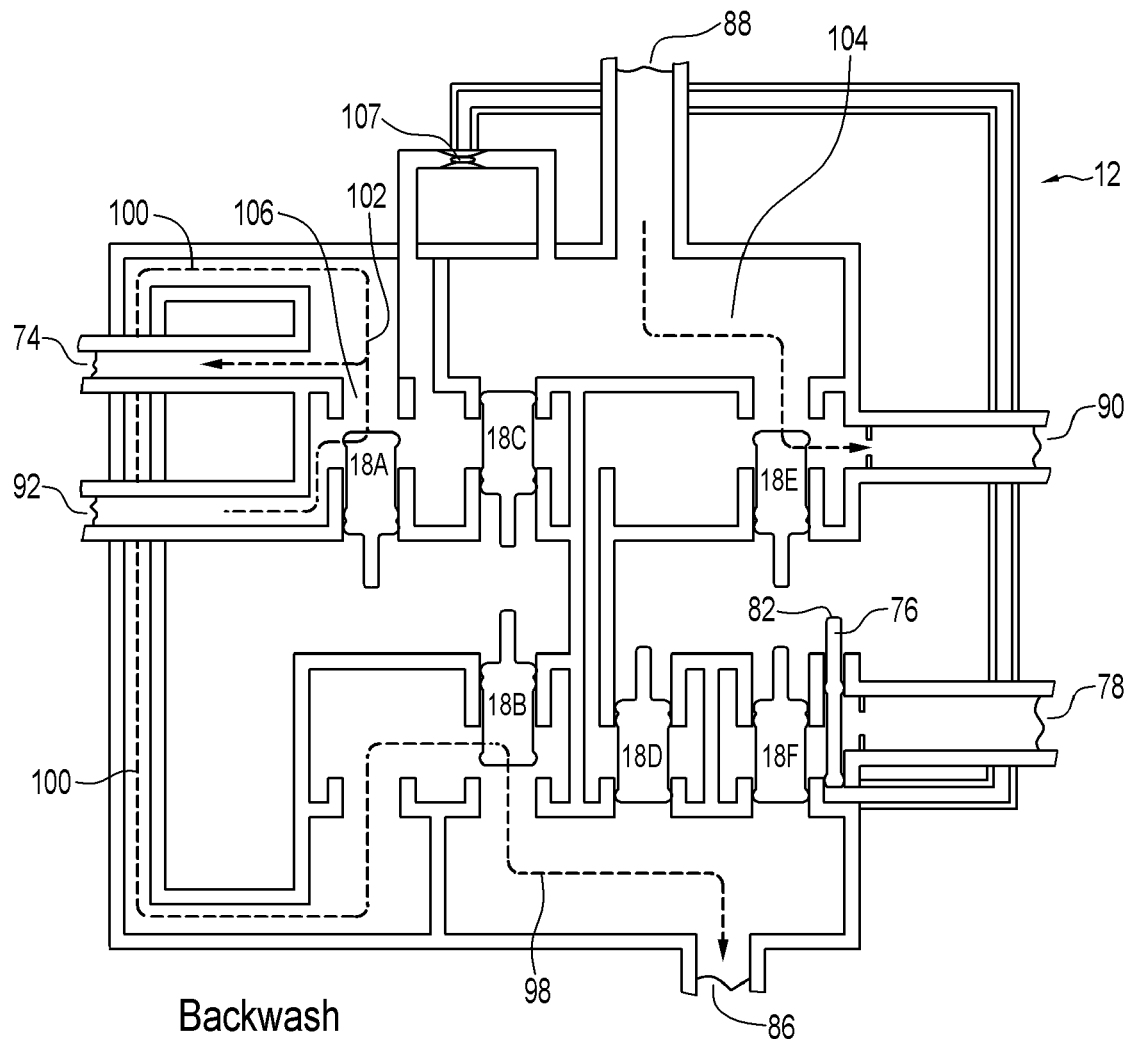
FIG. 6 is a schematic diagram of the valve assembly during the backwash cycle of the water softener.

FIG. 6 depicts the backwash phase, where water flows in the reverse direction through the treatment tank 97 to flush sediment and other debris from the valve assembly 10 and the treatment tank. Specifically, during backwash, raw water enters the assembly 10 through the raw water inlet 92, passes through a second channel 102 joining pistons 18A and 18B, passes through the third and second flow paths 100 and 98, respectively, and enters the treatment tank 97 through the tank outlet 86. The water flushes the sediment out of the treatment tank 97 via the tank inlet 88, passes through a fourth flow path 104 defined between the tank inlet and piston 18E, and exits the valve assembly 10 through the drain 90. A portion of the raw water that enters through the raw water inlet 92 is also diverted to exit the valve housing 12 through a fifth flow path 106 defined between piston 18A and the bypass valve 74 to be used by the consumer.

Figure 7:
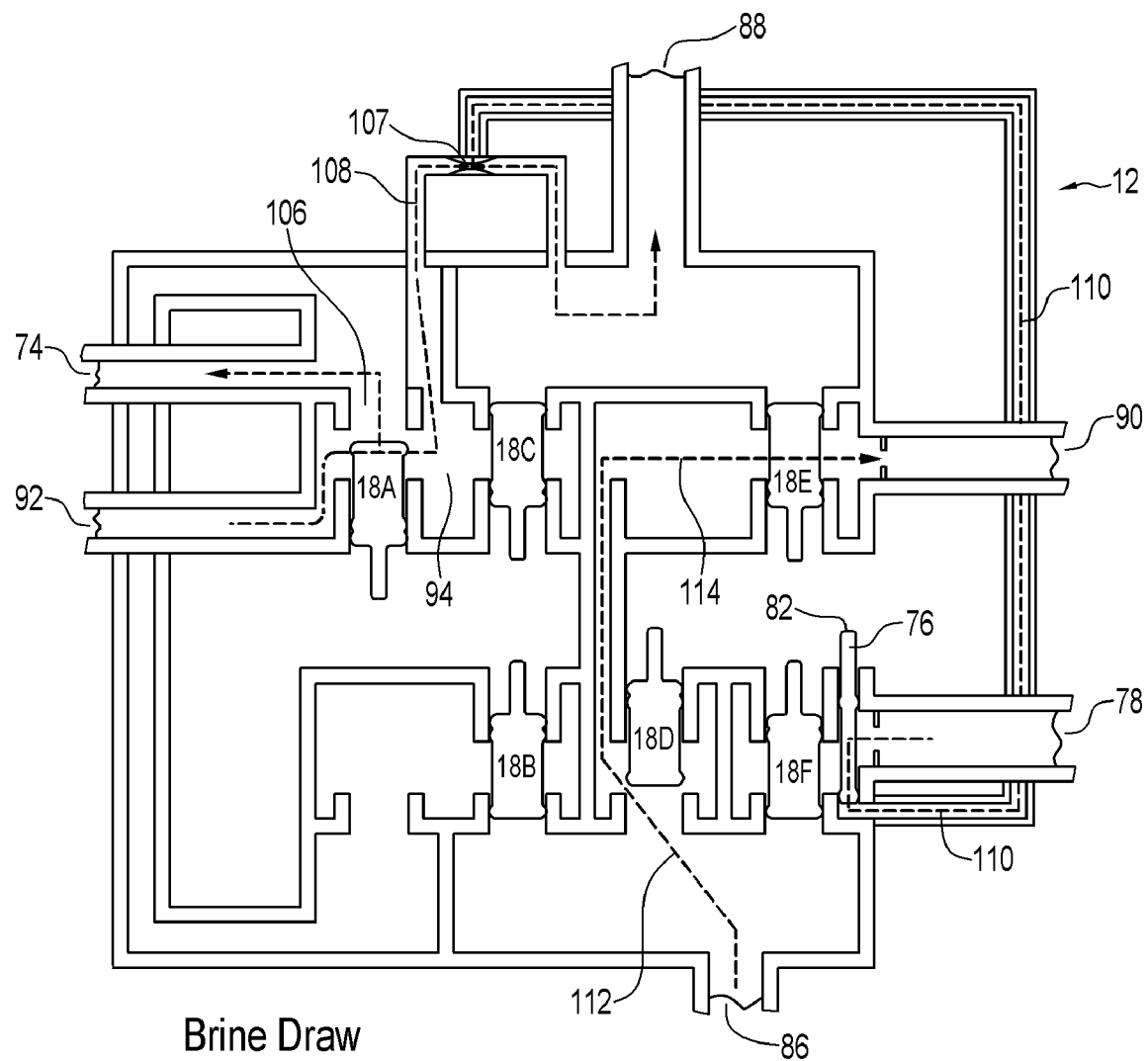
FIG. 7 is a schematic diagram of the valve assembly during the brine draw cycle of the water softener.

During the brine draw phase shown in FIG. 7, raw water enters the valve housing 12 through the raw water inlet 92, passes through a sixth flow path 108 defined between piston 18A and the tank inlet 88, and enters into the treatment tank 97. Midway along the sixth flow path 108, a venturi structure 107 is provided, which generates a small negative pressure into a seventh flow path 110 defined between the brine piston 76 and the tank inlet 88. This negative pressure is located at an end of the flow path 110 near the tank inlet 88, and provides the impetus for the brine solution to be drawn first out of a brine tank 109 (FIG. 11) through the brine tank valve 78, then through the seventh flow path 110, and into the treatment tank 97. After passing through the treatment tank 97, the water passes through an eighth flow path 112 defined between the tank outlet 86 and the piston 18D, through a third channel 114 joining the pistons 18D and 18E, and exits the valve housing 12 through the drain 90. So that water will be available to the user during regeneration, a portion of the water entering the raw water inlet 92 is diverted through the fifth flow path 106 defined between piston 18A and the bypass valve 74, exiting the housing 12.

Figure 8:
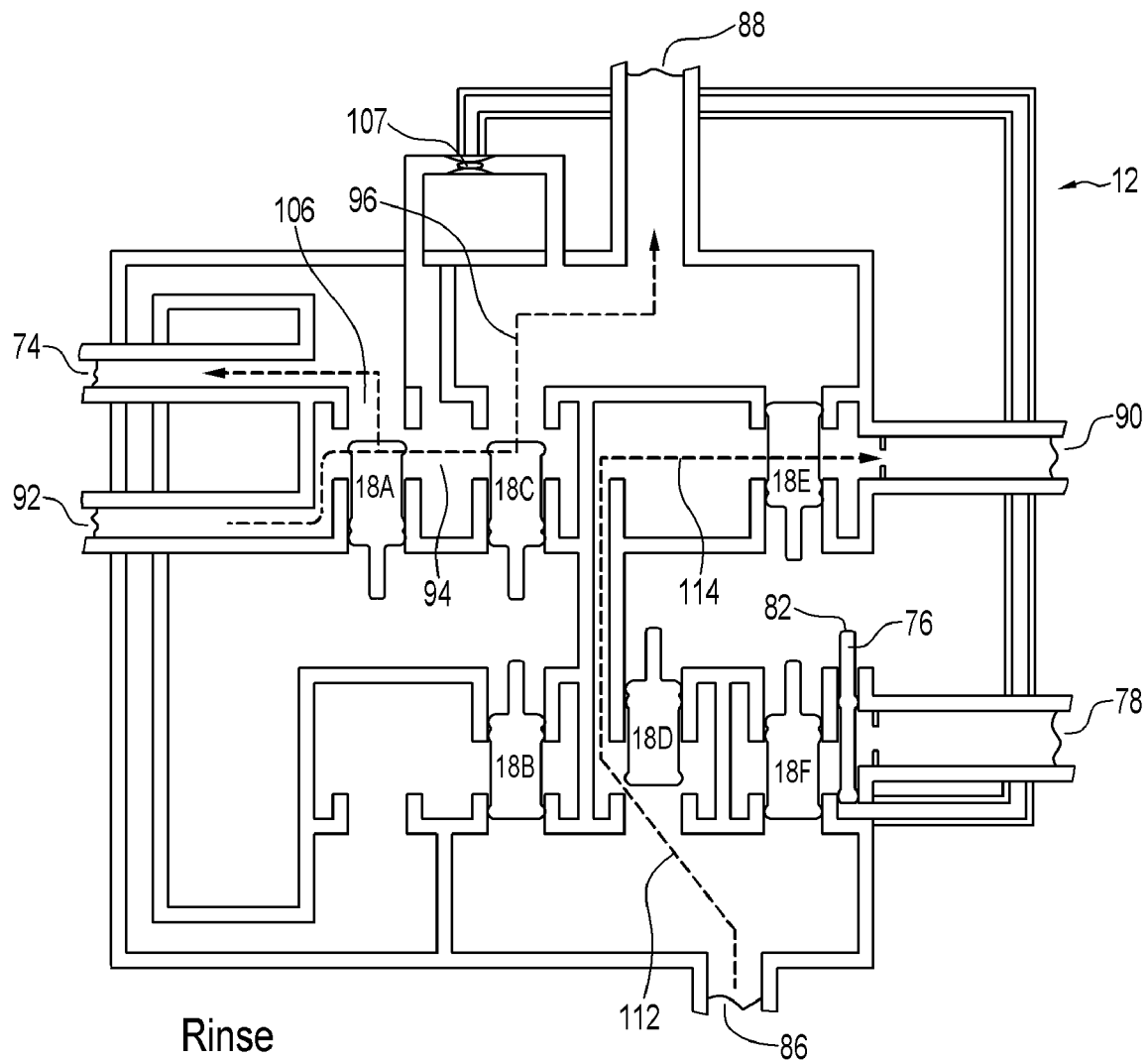
FIG. 8 is a schematic diagram of the valve assembly during the rinse cycle of the water softener.

FIG. 8 illustrates the rinse phase of the water softening system. Specifically, during the rinse phase, raw water enters the valve housing 12 via the raw water inlet 92, passes through the first channel 94 defined between pistons 18A and 18C, through the first flow path 96 defined between piston 18C and the tank inlet 88, and enters the treatment tank 97. The raw water rinses the brine out of the treatment tank 97, which exits through the tank outlet 86, passes through the eighth flow path 112 defined by the tank outlet and the piston 18D, through the third channel 114, and exits out the drain 90. To enable water use by the consumer during the rinse phase, a portion of the raw water that enters the housing 12 through the raw water inlet 92 passes through the fifth flow path 106 defined between piston 18A and the bypass valve 74, and exits the housing via the bypass valve.

Figure 9:
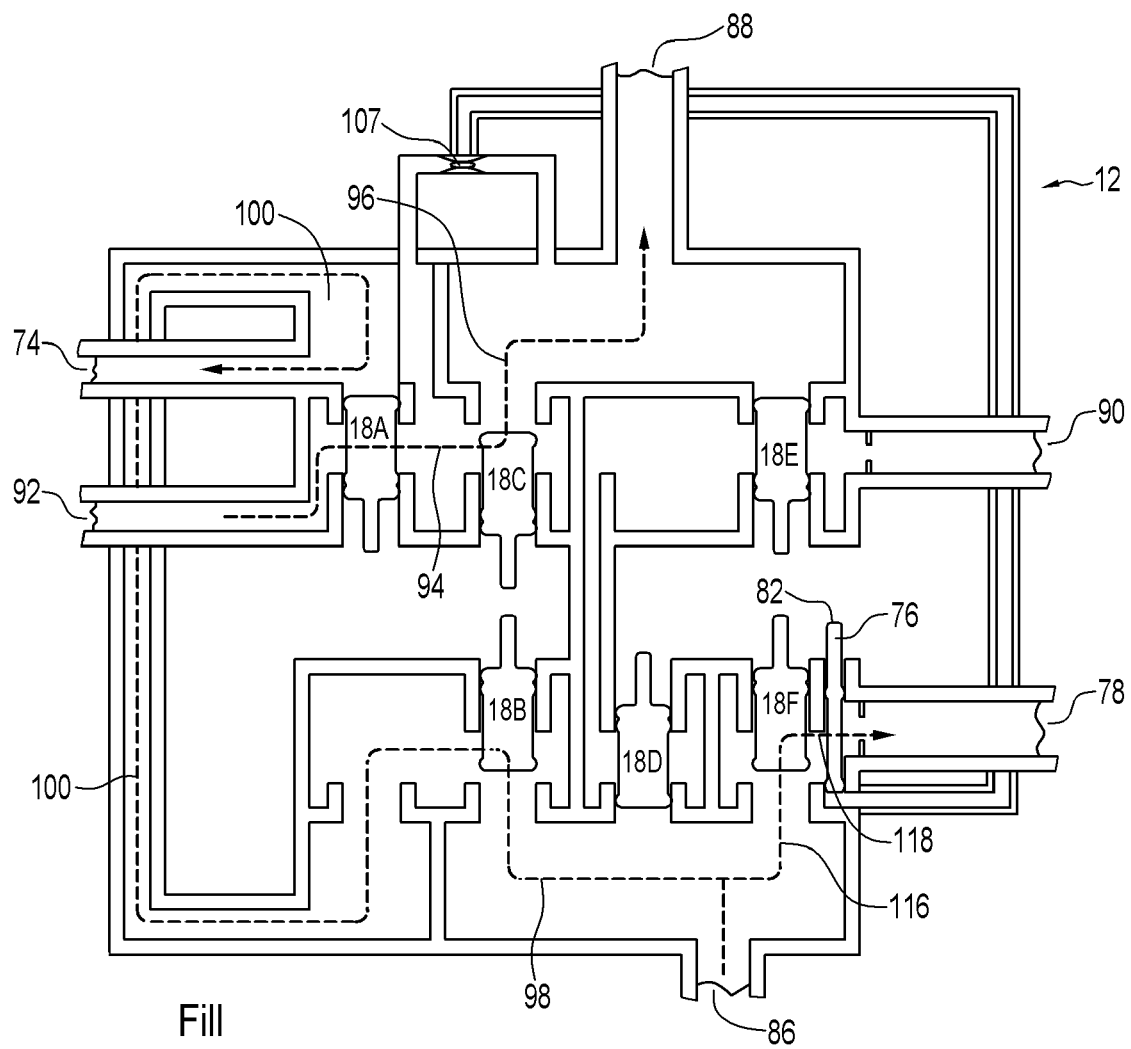
FIG. 9 is a schematic diagram of the valve assembly during the fill cycle of the water softener.

The fill step is depicted in FIG. 9. During fill, raw water enters the valve housing through the raw water inlet 92, passes through the first channel 94 defined between pistons 18A and 18C, through the first flow path 96 defined between piston 18C and the tank inlet 88, and enters the treatment tank 97. After water passes through the tank, it exits the treatment tank 97 via the tank outlet 86. A portion of the water exiting the treatment tank 97 passes through a ninth flow path 116 defined between the tank outlet 86 and piston 18F, through a fourth channel 118 joined between the piston 18F and the brine piston 76 and enters the brine tank 109 via the brine tank valve 78 to refill the brine tank. The remaining water entering the valve assembly 10 from the tank outlet 86 passes through the second flow path 98 defined between the tank outlet and the piston 18B, through the third flow path 100 defined between the piston 18B and the bypass valve 74, and exits the bypass valve for use by the consumer.

Figure 10:
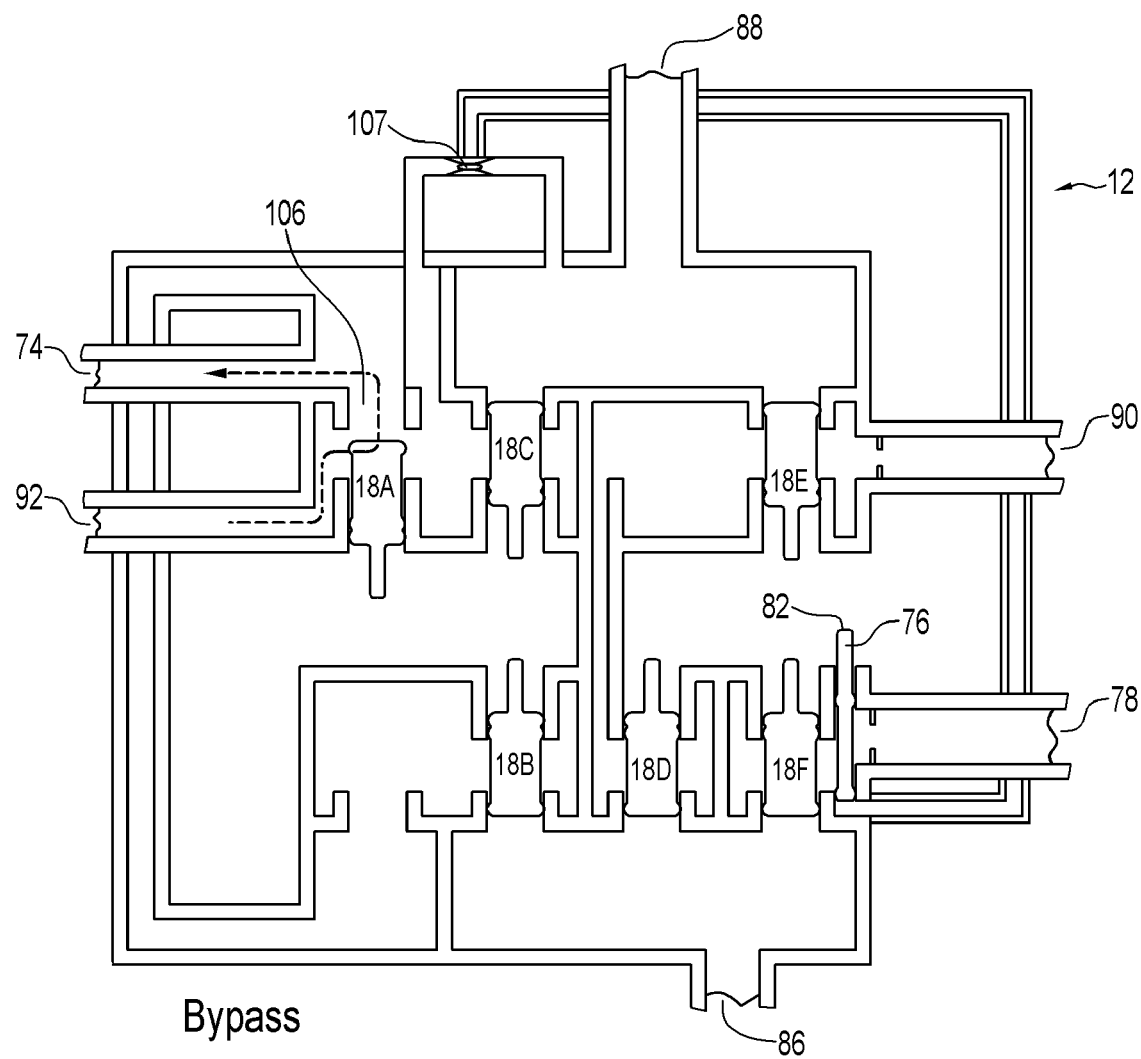
FIG. 10 is a schematic diagram of the valve assembly during the bypass condition of the water softener.

The present valve assembly 10 also includes a bypass step, shown in FIG. 10, which enables the customer to obtain bypassed water whenever desired. During the bypass step, raw water enters the raw water inlet 92, passes through the fifth flow path 106 defined between piston 18A and the bypass valve 74, and exits the bypass valve 74 for use by the consumer.

FIG. 11 indicates the position of the pistons 18A-18F (i.e., open, closed or not in use) during each of the above-identified softening steps in upflow, downflow and progressive flow regenerations. As seen in FIG. 11, the pistons 18A-18F and brine piston 76 open and close independently of each other, to enable more efficient sealing and improved water flow rates during the water softening process.

As mentioned above, the present assembly 10 enables the user or operator to switch between downflow, upflow and progressive flow regeneration without removing the valve housing 12 or replacing or altering the piston assemblies 16. To that end, the gearbox 32 is configured for being interchangeable. Specifically, the gearbox 32 is attached to the valve housing 12 by the plurality of fasteners 40 as shown in FIG. 2.

To change the water softener from a downflow regeneration (as described above) to an upflow regeneration, the user simply removes the gearbox 32 from the valve housing 12 by removing the fasteners 40, and attaches a new gearbox (not shown) to the housing that is configured for upflow regeneration. The cams within the upflow gearbox have different peaks and valleys configured specifically for upflow regeneration. Similarly, a gearbox for progressive flow regeneration can also be created by manipulating the peaks and valleys of the cams. Such interchangeability is a significant improvement over conventional water softeners, which require rotation of the eductor valve and removal of the seal pack assembly to change from downflow to upflow regeneration. The conventional process is time consuming and can reduce the operating efficiency of the valve.

The present control valve assembly 10 includes individual piston assemblies 16 independently configured for movement such that the respective sealing members 20 slide only when necessary to seal or open the respective flow paths. Further, the pistons 18A-18F in the present assembly are either entirely open or entirely closed, and accordingly do not need to be in a precise position relative to the flow path. In addition, the current control valve assembly 10 includes a gearbox 32 that can easily be removed and reconfigured to change the water softening system between upflow, downflow and progressive flow regeneration.

While a particular embodiment of the present control valve assembly has been described herein, it will be appreciated by those skilled in the art that changes and modifications may be made thereto without departing from the invention in its broader aspects and as set forth in the following claims.

The invention claimed is:

1. A control valve assembly for a fluid treatment system comprising:
    a valve housing defining a plurality of compartments;
    a piston assembly associated with each of said compartments, each of said piston assemblies configured to be independently movable in each of said compartments;
    a gearbox associated with said housing and including a plurality of separate, individual cams driven by a motor drive gear powered by a motor, at least one of said cams having a toothed end including teeth projecting radially outwardly from an outer peripheral edge of the cam for receiving driving force from said motor drive gear, and each said cam being configured to drive a corresponding one of said piston assemblies; and
    each said cam includes a top peripheral edge located opposite of said toothed end, said top peripheral edge having at least one peak and valley constructed and arranged for being engaged by a corresponding one of said piston assemblies.

2. The control valve assembly of claim 1, wherein each of said piston assemblies includes a piston having at least one sealing member positioned between said piston and an adjacent wall of a corresponding one of said compartments.

3. The control valve assembly of claim 2, wherein each of said piston assemblies further includes a sleeve surrounding said wall and constructed and arranged for receiving said piston during reciprocation.

4. The control valve assembly of claim 2, wherein each of said compartments includes a biasing member constructed and arranged for biasing a corresponding one of said pistons.

5. The control valve assembly of claim 2, wherein each of said pistons includes a nodule extending from a top end of said piston for engaging one of said cams during reciprocation of said piston.

6. The control valve assembly of claim 5, wherein each of said cams includes opposite said toothed end, a top peripheral edge defining a combination of peaks and valleys on said top peripheral edge, each of said peaks and valleys configured to be engaged by said nodule such that when said nodule is at one of said peaks, a respective flow path within the housing is closed, and when said nodule is at one of said valleys, said flow path is open.

7. The control valve assembly of claim 1, wherein each of said piston assemblies includes a piston having a plurality of sealing members positioned between said piston and an adjacent wall of a corresponding one of said compartments, said sealing members being concentrically aligned with each other and axially spaced along said piston for providing a plurality of sealing surfaces between said piston and said wall.

8. The control valve assembly of claim 1, wherein said gearbox further includes a cover including a plurality of indentations, each said cam having a corresponding indentation.

9. The control valve assembly of claim 1, wherein said gearbox further includes a sensor and a position feedback gear having a plurality of slots, each of said slots configured for optically interacting with said sensor, wherein said sensor is configured for communicating with a fluid treatment system controller.

10. The control valve assembly of claim 1, wherein each of said top peripheral edges of said cams defines a combination of said at least one peak and valley spaced around a circumference of said top peripheral edge, each of said pistons travelling along a corresponding one of said peripheral edges such that when each of said pistons is at one of said peaks, a respective flow path within said housing is closed, and when each of said pistons is at one of said valleys, said flow path is open.

11. A control valve assembly for a fluid treatment system comprising:
    a valve housing having a plurality of piston assemblies, each of said piston assemblies including a piston, at least one sealing member engaging said piston, and a biasing member;
    a motor having a drive shaft;
    a gearbox including:
        a motor drive gear powered by said drive shaft;
        a plurality of separate, individual cams, each said cam having a toothed end and a piston engaging end; the toothed end configured for driving connection to said motor drive gear, the piston engaging end being constructed and arranged for driving a corresponding one of said pistons and having a generally circular cross-sectional shape taken about an axis of rotation of at least one of said cams;
        at least one position feedback gear having teeth and configured for being driven by toothed engagement with one of said cams; and
        a sensor configured for optically interacting with said position feedback gear to communicate a status of the fluid treatment system to a controller.

12. The control valve assembly of claim 11, wherein said valve housing includes a plurality of open-ended compartments each configured for receiving one of said piston assemblies, said piston assemblies constructed and arranged for operating independently of each other.

13. The control valve assembly of claim 12, wherein each of said compartments further includes a sleeve surrounding an adjacent wall of said compartment and constructed and arranged for receiving a corresponding one of said pistons.

14. The control valve assembly of claim 11, wherein each of said cams rotates about an axis parallel to a direction of travel of said pistons, and includes a top peripheral edge configured for being engaged by one of said pistons and having a combination of peaks and valleys.

15. The control valve assembly of claim 14, wherein each piston includes a nodule extending from a top edge of said piston, said nodule configured for traveling along said top peripheral edge such that when said nodule contacts one of said peaks, said piston reciprocates such that a respective flow path is closed, and when said nodule is contacts one of said valleys, said piston reciprocates such that said respective flow path is open.

16. The control valve assembly of claim 11, wherein said position feedback gear includes a plurality of slots, each of said slots configured for optically interacting with said sensor, and said toothed ends of said cams and said at least one position feedback gear being generally coplanar.

17. A control valve assembly for a fluid treatment system comprising:
- a valve housing having a plurality of piston assemblies, each of said piston assemblies including a piston and a nodule extending from a top edge of said piston;
- a gearbox including a plurality of individual, separate cams each having a top peripheral edge, the cams being driven by a motor to each rotate about an axis which is parallel to a direction of motion of said pistons, each of said nodules constructed and arranged for travel along a corresponding one of said peripheral edges for opening and closing a respective flow path within said valve housing; and
- each of said top peripheral edges defines a combination of spaced peaks and valleys, each of said peaks and valleys constructed and arranged for being engaged by said nodule such that when said nodule is at one of said peaks, a respective flow path within the housing is closed, and when said nodule is at one of said valleys, said flow path is open.

18. The control valve assembly of claim 17, wherein said gearbox further includes a sensor and a position feedback gear having a plurality of slots, each of said slots configured for optically interacting with said sensor, wherein said sensor is configured for communicating with a fluid treatment system controller as said cams are driven by said motor.

* * * * *

UNITED STATES PATENT AND TRADEMARK OFFICE
CERTIFICATE OF CORRECTION

| | | |
|---|---|---|
| PATENT NO. | : 8,302,631 B2 | Page 1 of 1 |
| APPLICATION NO. | : 12/242287 | |
| DATED | : November 6, 2012 | |
| INVENTOR(S) | : Quinn, Reed and Morrison | |

It is certified that error appears in the above-identified patent and that said Letters Patent is hereby corrected as shown below:

In the Specification:

In Column 6, Line 27 of the issued patent and Page 3, Line 12 of Amendment B, please insert, -- Thus, a rotational axis of each of the cams 44A-44Fs is generally parallel to a direction of travel of the pistons 18A-18F.-- after "which is described in further detail below."

Signed and Sealed this
Seventeenth Day of June, 2014

Michelle K. Lee
*Deputy Director of the United States Patent and Trademark Office*